United States Patent
Palusa et al.

(10) Patent No.: US 8,787,439 B2
(45) Date of Patent: Jul. 22, 2014

(54) DECISION FEEDFORWARD EQUALIZATION

(75) Inventors: Chaitanya Palusa, Fremont, CA (US); Tomasz Prokop, Pleasanton, CA (US); Adam B. Healey, Newburyport, MA (US); Ye Liu, San Jose, CA (US)

(73) Assignee: LSI Corporation, Milpitas, CA (US)

(*) Notice: Subject to any disclaimer, the term of this patent is extended or adjusted under 35 U.S.C. 154(b) by 176 days.

(21) Appl. No.: 13/419,009

(22) Filed: Mar. 13, 2012

(65) Prior Publication Data

US 2013/0243066 A1 Sep. 19, 2013

(51) Int. Cl.
*H04L 27/22* (2006.01)

(52) U.S. Cl.
USPC .......................... 375/233; 375/350; 708/323

(58) Field of Classification Search
USPC .......... 375/229–233, 346, 348, 350; 708/300, 708/301, 322, 323
See application file for complete search history.

(56) References Cited

U.S. PATENT DOCUMENTS

| | | | |
|---|---|---|---|
| 6,754,294 B1* | 6/2004 | Adireddy et al. | 375/348 |
| 8,135,057 B2* | 3/2012 | Mondragon-Torres et al. | 375/232 |
| 2004/0213342 A1* | 10/2004 | Ghosh | 375/233 |
| 2012/0057626 A1* | 3/2012 | Zhong | 375/233 |

* cited by examiner

*Primary Examiner* — Dac Ha

(57) ABSTRACT

In described embodiments, a Decision Feed Forward Equalizer (DFFE) comprises a hybrid architecture combining features of a Feed Forward Equalizer (FFE) and a Decision Feedback Equalizer (DFE). An exemplary DFFE offers relatively improved noise and crosstalk immunity than an FFE implementation alone, and relatively lower burst error propagation than a DFE implementation alone. The exemplary DFFE is a relatively simple implementation due few or no critical feedback paths, as compared to a DFE implementation alone. The exemplary DFFE allows for a parallel implementation of its DFE elements without an exponential increase in the hardware for higher numbers of taps. The exemplary DFFE allows for cascading, allowing for progressive improvement in BER, at relatively low implementation cost as a solution to achieve multi-tap DFE performance.

17 Claims, 7 Drawing Sheets

US 8,787,439 B2

DECISION FEEDFORWARD EQUALIZATION

BACKGROUND OF THE INVENTION

A generic communication link comprises a transmitter, communication channel, and receiver. A Serializer—Deserializer (SerDes) receiver is an example of a device that processes analog signals transmitted through a channel, and the SerDes receiver typically includes components to compensate for impairments introduced by the channel. Such impairments typically include added noise and inter-symbol interference characterized by the transfer function of the communication channel.

A SerDes receiver includes equalization, for which the datapath typically includes a combination of a Continuous-Time Linear Equalizer (CTLE), a Feed Forward Equalizer (FFE), a Decision Feedback Equalizer (DFE), and various adaptation circuits employed to adapt the various equalizer and filter parameters. For a digital implementation of a SerDes receiver, clock frequencies available for datapath signal processing (DSP) and clock and data recovery (CDR) are an order of magnitude, for example, of 8-10 times the signal frequency, lower that in case of an analog equalization datapath. To maintain the data rate through the SerDes receiver, the digital implementation datapath is parallelized by the same factor (8-10 times). DFE implementations generally do not parallelize efficiently due a requirement of an immediate feedback from the previous bit to the next bit of processed data. To address this architectural feature in parallel implementations of the DFE, an unrolling technique may be used, but this unrolling technique yields prohibitively large designs for practical applications. Cost of implementing a multi-tap DFE solution is generally prohibitive in higher data rate applications because of the requirement of a1-UI (unit interval) feedback in a non-unrolled implementation, or because of exponential growth in gate count and power in the case of parallel unrolled implementation.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allows for generating data from an input signal received from a channel. A sampling module generates samples from the input signal. A feed-forward equalizer stage i) applies feed-forward equalization to the samples and ii) generates feed-forward decisions corresponding to the samples. A decision feed-forward stage includes a latency matching module, logic, and a decision device. The latency matching module adjusts a delay of the feed-forward equalized samples in accordance with the feed-forward decisions corresponding to the samples to generate latency-matched feed-forward equalized samples. The logic i) generates a combination of the feed-forward equalized decisions and at least one filter tap value based on a transfer function of the channel, and ii) subtracts the combination from the latency-matched feed-forward equalized samples. A decision device generates decision feed-forward equalized (DFFE) decisions from the output of the logic.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with exemplary embodiments of the present invention, a Decision Feed Forward Equalizer (DFFE) comprises a hybrid architecture combining features of a Feed Forward Equalizer (FFE) and a Decision Feedback Equalizer (DFE). An exemplary DFFE offers relatively improved noise and crosstalk immunity than an FFE implementation alone, and relatively lower burst error propagation than a DFE implementation alone. The exemplary DFFE is a relatively simple implementation due to no critical feedback paths, as compared to a DFE implementation alone. The exemplary DFFE allows for a parallel implementation of its DFE elements without an exponential increase in the hardware for higher numbers of taps. The exemplary DFFE allows for cascading, allowing for progressive improvement in BER, at relatively low implementation cost as a solution to achieve multi-tap DFE performance.

Figure 1:
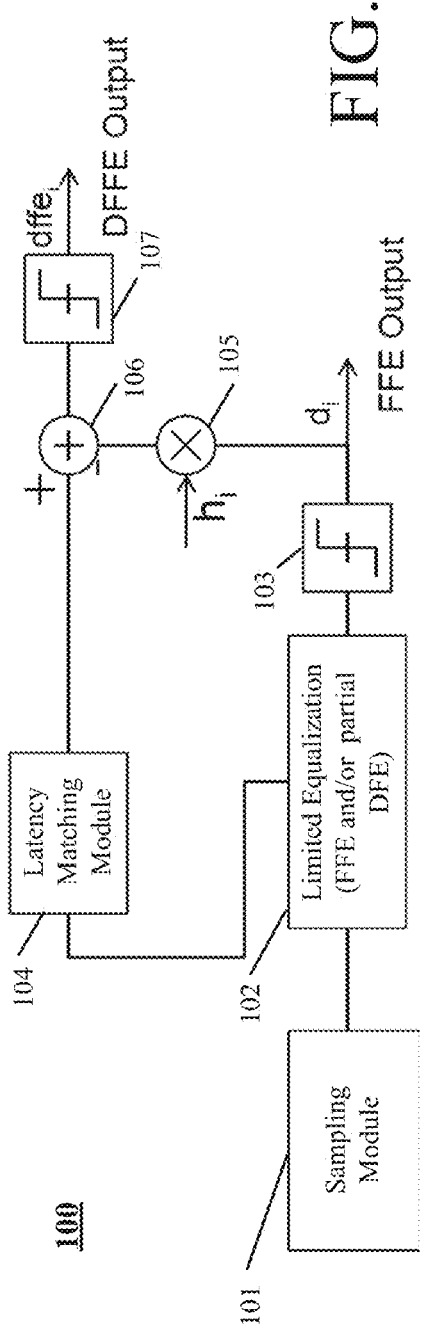
FIG. 1 shows a Decision Feed Forward Equalizer operating in accordance with exemplary embodiments of the present invention.

FIG. 1 shows DFFE 100 operating in accordance with exemplary embodiments of the present invention. DFFE 100 comprises sampling module 101, FFE 102, first decision device 103, latency matching module 104, multiplier 105, combiner 106, and second decision device 107. Sampling module 101 receives the un-equalized input signal from the communication channel, samples, and quantizes the analog input signal into digital samples for subsequent processing. Sampling module 101 might be implemented as a simple analog-to-digital converter (ADC).

FFE 102 applies feed forward equalization to the sampled input signal. FFE 102 might be followed by a simple, one or two tap partial DFE, to improve initial equalization performance. The feed forward-equalized signal from FFE 102 is applied to decision device 103, which might be implemented as a slicer or comparator, to provide FFE output decisions $d_j$. The feed forward-equalized signal from FFE 102 is applied to decision device 103, which might be implemented as a slicer or comparator, to provide FFE output decisions $d_j$. The output decisions $d_j$ are then employed to reconstruct the ISI of the input signal by multiplying, in multiplier 105, with corresponding tap coefficients $h_j$. The reconstructed signal represents ISI from the former bits.

The feed forward-equalized signal from FFE 102 is also applied to latency matching 104, which might be implemented as one or more digital delay (e.g., flip flops or latches), to align the reconstructed input signal from multiplier 105 with the FFE output decisions $d_j$. The reconstructed signal is then subtracted, in combiner 106, from the latency matched, feed forward-equalized signal from FFE 102 to correct for ISI from the former bits. The corrected signal from combiner 106 is applied to decision device 107, which generates DFFE output decisions for the input bit samples. Decision device 107 might also be implemented as a slicer or comparator.

Figure 2:
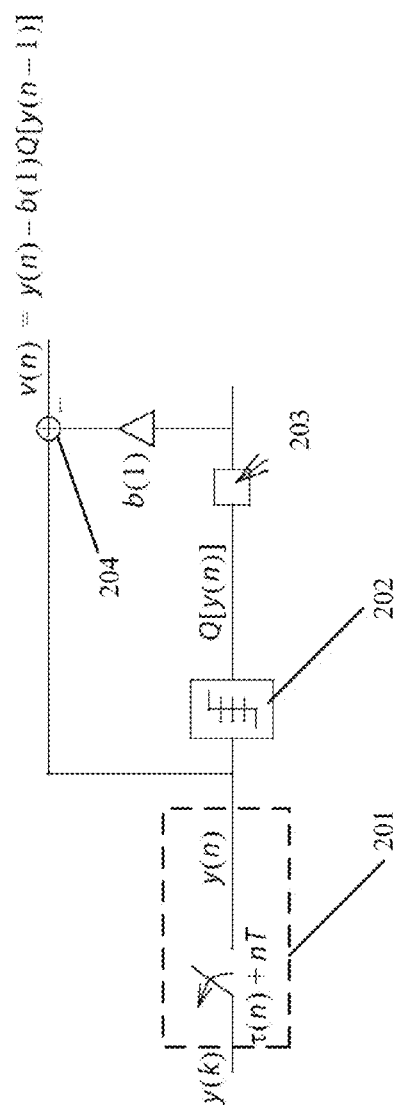
FIG. 2 shows an exemplary structure for a one-tap Decision Feed Forward Equalizer as shown in FIG. 1.

For a one tap, small DFFE structure, the bit error rate (BER) of the DFFE output decisions might be shown as half of the BER of the FFE output decisions, or relatively less. FIG. 2 shows an exemplary structure for a one-tap Decision Feed Forward Equalizer as shown in FIG. 1 for which performance of the DFFE might be analyzed. The input signal is sampled in sampler 201 to provide the raw samples y[n] that are applied to decision device 202 that generates decisions Q[y(n)] (note that the samples are generated at period nT, and phase offset τ(n)). Samples are delayed by one period ($z^{-1}$) by latch 203. The equalizer output sample v[n] is given as in relation (1):

$$v(n)=h(0)x(n)+h(1)(x(n-1)-b(1)Q[h(0)x(n-1)+h(1)x(n-2)] \quad (1)$$

Figure 3:
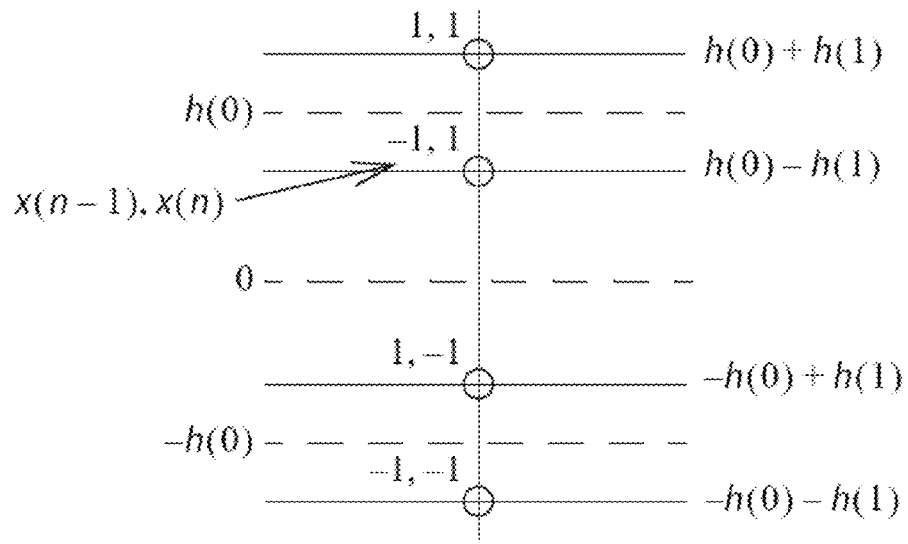
FIG. 3 shows a constellation diagram for the input samples applied to the exemplary structure of FIG. 2.
Figure 4:
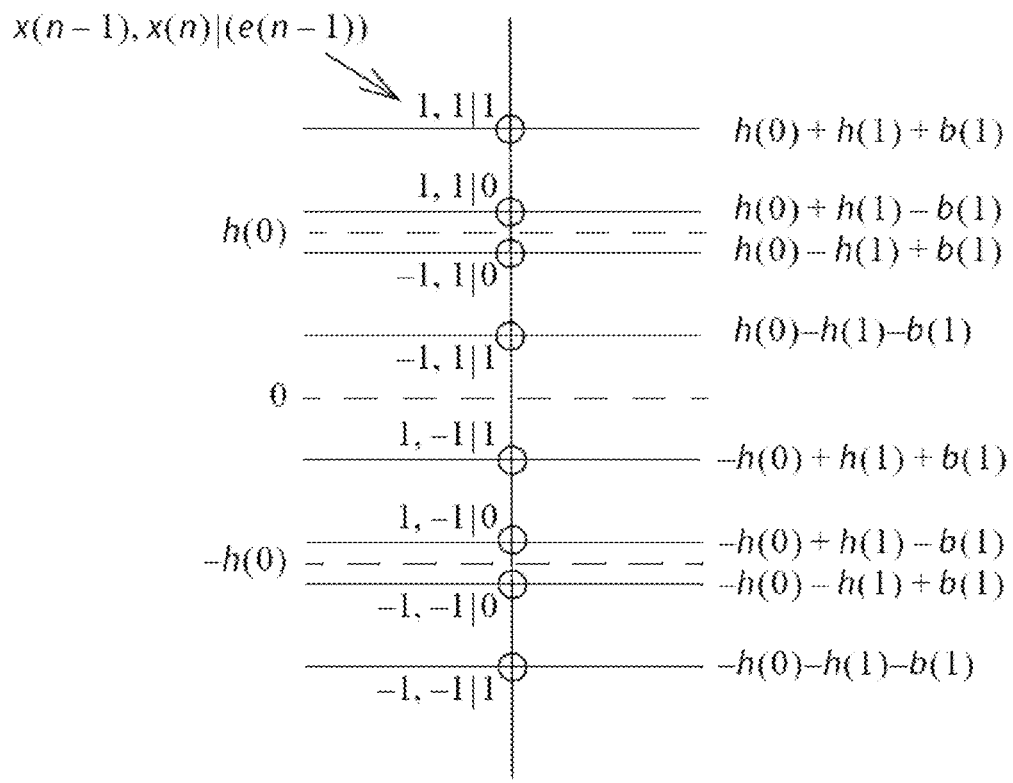
FIG. 4 shows a constellation diagram for corrected samples provided by the exemplary structure of FIG. 2.

From relation (1), an equalizer desirably selects the h(1) and b(1) values so as to cancel each other's terms, so that the scaled symbol remains. Therefore, the performance of equalization is related to the quality of the symbol estimate. FIG. 3 shows a constellation diagram for the input samples applied to the exemplary structure of FIG. 2. For 2-PAM (pulse amplitude modulation) such at that x(n) is drawn from the alphabet {−1, 1}, the input samples to the receiver might take one of four values as shown in FIG. 3. If e(n) is defined as an error indicator function that takes a value of 0 when Q[y(n)]=x(n) and a value of 1 otherwise; the transmitted symbols are equiprobable; the quantizer decision threshold is 0; and the channel signal to noise (SNR) ratio is h(0)/σ, then the probability that the symbol estimate is incorrect (e.g., e(n)=1) might be as given in relations (2) and (3):

$$P_e(x(n-1),x(n))=(1/2)\text{erfc}((1/\sqrt{2}\sigma)(|h(0)(x(n)+h(1)x(n-1)|) \quad (2)$$

$$P_e^{raw}=(1/4)(P_e(-1,-1)+P_e(1,-1)+P_e(-1,1)+P_e(1,1)), \quad (3)$$

where erfc is the complementary error function. Consequently, FIG. 4 shows a constellation diagram for corrected samples provided by the exemplary structure of FIG. 2. As shown in FIG. 4, an incorrect symbol estimate leads to a higher probability for error. However, the likelihood of mis-correction also influences post-correction symbol error ration. Since e(n−1) is a function of x(n−1) and x(n−2), the analysis considers all possible sequences of three symbols. The conditional probability that the corrected sample yields a symbol error, given that the quantizer provides a good symbol estimate, is defined in relation (4), and the conditional probability that the corrected sample yields a symbol error, given that the quantizer provides a bad symbol estimate, is defined in relation (5):

$$P_e(x(n-1),x(n)|e(n-1)=0)=(1/2)\text{erfc}((1/\sqrt{2}\sigma)(|h(0)(x(n)+(h(1)-b(1))x(n-1)|) \quad (4)$$

$$P_e(x(n-1),x(n)|e(n-1)=1)=(1/2)\text{erfc}((1/\sqrt{2}\sigma)(|h(0)(x(n)+(h(1)+b(1))x(n-1)|) \quad (5)$$

Relation (5) is valid for h(1)+b(1)≤h(0), which typically equates to 2h(1) h(0). The probability of error at the DFFE, (PE(dffe)), is the sum of the terms in Table 1 divided by 8. Table 1 presents components for the DFFE probability of error calculation:

TABLE 1

| x(n − 2) | x(n − 1) | x(n) | Probability of Error |
|---|---|---|---|
| 1 | 1 | 1 | $(1 - P_e(1, 1)) P_e(1, 1|0) + P_e(1, 1) P_e(1, 1|1)$ |
| 0 | 1 | 1 | $(1 - P_e(0, 1)) P_e(1, 1|0) + P_e(0, 1) P_e(1, 1|1)$ |
| 1 | 0 | 1 | $(1 - P_e(1, 0)) P_e(0, 1|0) + P_e(1, 0) P_e(0, 1|1)$ |
| 0 | 0 | 1 | $(1 - P_e(0, 0)) P_e(0, 1|0) + P_e(0, 0) P_e(0, 1|1)$ |
| 1 | 1 | 0 | $(1 - P_e(1, 1)) P_e(1, 0|0) + P_e(1, 1) P_e(1, 0|1)$ |
| 0 | 1 | 0 | $(1 - P_e(0, 1)) P_e(1, 0|0) + P_e(0, 1) P_e(1, 0|1)$ |
| 1 | 0 | 0 | $(1 - P_e(1, 0)) P_e(0, 0|0) + P_e(1, 0) P_e(0, 0|1)$ |
| 0 | 0 | 0 | $(1 - P_e(0, 0)) P_e(0, 0|0) + P_e(0, 0) P_e(0, 0|1)$ |

The probability pe($h_i$) might shown to have a maximum 0.5 by analysis, and, while he probability of wrong DFE correction is 0.5, the error due to wrong DFE correction is actually lesser, in some cases much lesser, than 0.5. In practice, the DFE correction due to multiple incorrect samples might offset each other. For example, for 2 bit errors, only 1 possibility strictly degrades performance when the actual bits corresponding to the incorrect samples are different from the current bit. When the bits are the same as the current bit, the result is 'incorrect' but 'helpful' DFE correction. When only one of the bits corresponding to the incorrect samples is the same as the current bit, the DFE correction due to both the bits offset each other, but the resultant sum is in the 'helpful' direction half the time. Thus, given the analysis for a single-stage from relations (1) through (5), and an incorrect FFE sample only impacts the DFFE output half the time (when $d_0$ not equal to $d_1$), and an incorrect FFE sample helps in the case of $d_0$=$d_1$.

Figure 5:
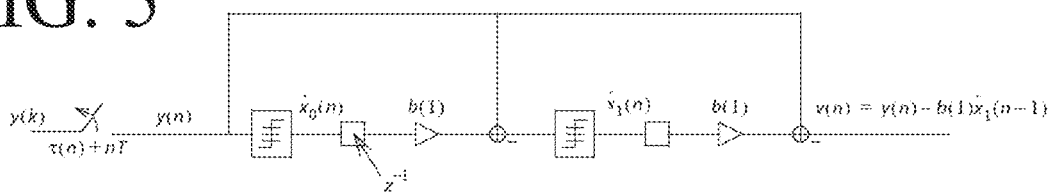
FIG. 5 shows an exemplary structure for a cascaded, one-tap Decision Feed Forward Equalizer based on the structure as shown in FIG. 1.

The exemplary DFFE of FIG. 1 might be expanded to a multi-stage cascaded DFFE with chained DFFE structures. Each stage uses the estimate of the symbols from the previous stage. The improved symbol estimates reduce the probability of mis-correction in the next stage, yielding better symbol estimates. Each stage of the cascaded DFFE provides for successively lower BER. For example, with a 2 times improvement in BER, a 10-stage cascaded DFFE might achieve a 1000 times improvement in BER over the FFE output decision BER, if other factors, such as quantization noise, are disregarded. FIG. 5 shows an exemplary structure for a cascaded, one-tap Decision Feed Forward Equalizer based on the structure as shown in FIG. 2, which might be analyzed in a manner analogous to that given above with respect to FIGS. 1 and 2.

Figure 6:
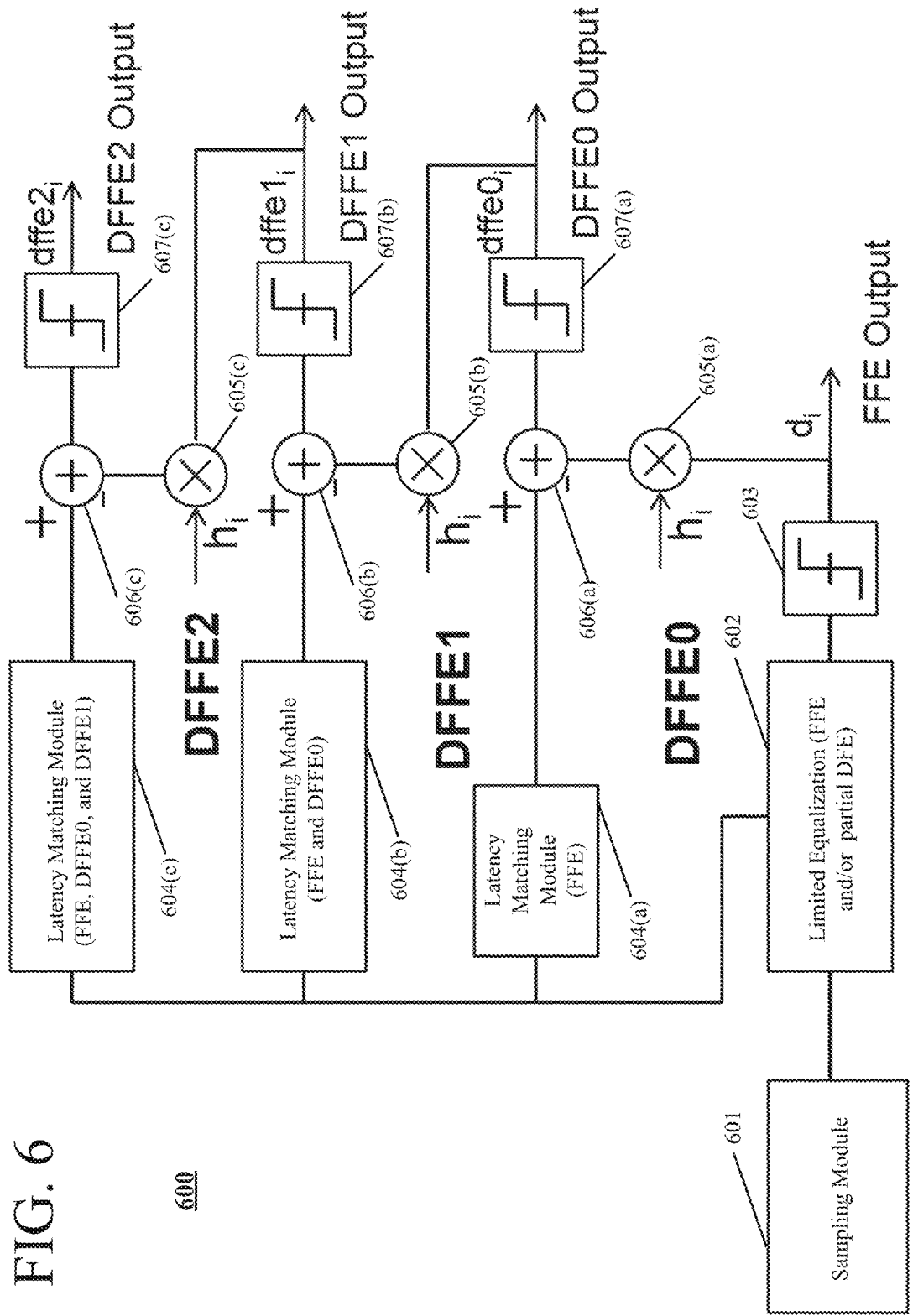
FIG. 6 shows a first cascaded implementation of a Decision Feed Forward Equalizer in accordance with an exemplary embodiment of the present invention.

FIG. 6 shows first cascaded implementation 600 of DFFE in accordance with an exemplary embodiment of the present invention. DFFE 600 comprises sampling module 601, FFE 602, FFE decision device 603, latency matching modules 604(*a*)-604(*c*), multipliers 605(*a*)-685(*c*), combiners 606(*a*)-606(*c*), and DFFE decision devices 607(*a*)-607(*c*). Sampling module 601 receives the un-equalized input signal from the communication channel, samples, and quantizes the analog input signal into digital samples for subsequent processing.

Sampling module 601 might be implemented as a simple analog-to-digital converter (ADC).

FFE 602 applies feed forward equalization to the sampled input signal. FFE 602 might include a simple, one or two tap DFE, to improve equalization performance. The feed forward-equalized signal from FFE 602 is applied to decision device 603, which might be implemented as a slicer or comparator, to provide FFE output decisions $d_i$. The feed forward-equalized signal from FFE 602 is applied to decision device 603, which might be implemented as a slicer or comparator, to provide FFE output decisions $d_i$.

For a first stage of cascaded implementation 600, a first DFFE output (DFFE0) is generated. The output decisions $d_i$ of the feed forward-equalized signal from FFE 602 are then employed to reconstruct the input signal ISI by multiplying, in multiplier 605(a), with corresponding tap coefficients $h_i$. The reconstructed signal represents ISI from the former bits. The feed forward-equalized signal from FFE 602 is also applied to latency matching 604(a), which might be implemented as one or more digital delay (e.g., flip flops or latches), to align the reconstructed input signal from multiplier 605(a) with the FFE output decisions $d_i$. The reconstructed signal is then subtracted, in combiner 606(a), from the latency matched, feed forward-equalized signal from FFE 602 to correct for ISI from the former bits. The corrected signal from combiner 606(a) is applied to decision device 607(a), which generates first stage DFFE0 output decisions dffe0$_i$ for the input bit samples. Decision device 607(a) might also be implemented as a slicer or comparator.

For a second stage of cascaded implementation 600, a second DFFE output (DFFE1) is generated. The output decisions dffe0$_i$ of the first stage are then employed to reconstruct the input signal ISI by multiplying, in multiplier 605(b), with corresponding tap coefficients $h_i$. The feed forward-equalized signal from FFE 602 is also applied to latency matching 604(b), which might be implemented as one or more digital delay (e.g., flip flops or latches), to align the reconstructed input signal ISI from multiplier 605(b) with the FFE output decisions $d_i$, and with the DFFE0 output decisions dffe0$_i$. The reconstructed signal ISI is then subtracted, in combiner 606(b), from the latency matched, feed forward-equalized signal from FFE 602 to correct for ISI from the former bits. The corrected signal from combiner 606(b) is applied to decision device 607(b), which generates second stage DFFE1 output decisions dffe1$_i$ for the input bit samples. Decision device 607(b) might also be implemented as a slicer or comparator. The first stage DFFE1 output decisions dffe0$_i$ and second stage DFFE1 output decisions dffe1$_i$ for the input bit samples are considered "soft" decisions for the input bits.

For a third stage of cascaded implementation 600, a third DFFE output (DFFE2) is generated. The output decisions dffe1$_i$ of the second stage are then employed to reconstruct the input signal by multiplying, in multiplier 605(c), with corresponding tap coefficients $h_i$. The feed forward-equalized signal from FFE 602 is also applied to latency matching 604(c), which might be implemented as one or more digital delay (e.g., flip flops or latches), to align the reconstructed input signal from multiplier 605(c) with the FFE output decisions $d_i$, with the DFFE0 output decisions dffe0$_i$, and with the DFFE1 output decisions dffe1$_i$. The reconstructed ISI is then subtracted, in combiner 606(c), from the latency matched, feed forward-equalized signal from FFE 602 to correct for ISI from the former bits. The corrected signal from combiner 606(c) is applied to decision device 607(c), which generates third stage DFFE2 output decisions dffe2$_i$ for the input bit samples. Decision device 607(c) might also be implemented as a slicer or comparator. Third stage DFFE2 output decisions dffe2$_i$ for the input bit samples are then employed as "hard" decisions for the input bits. The present invention is not limited to a three stage implementation; one skilled in the art might employ two stages, or might extend to more stages the based on the teachings herein.

Figure 7:
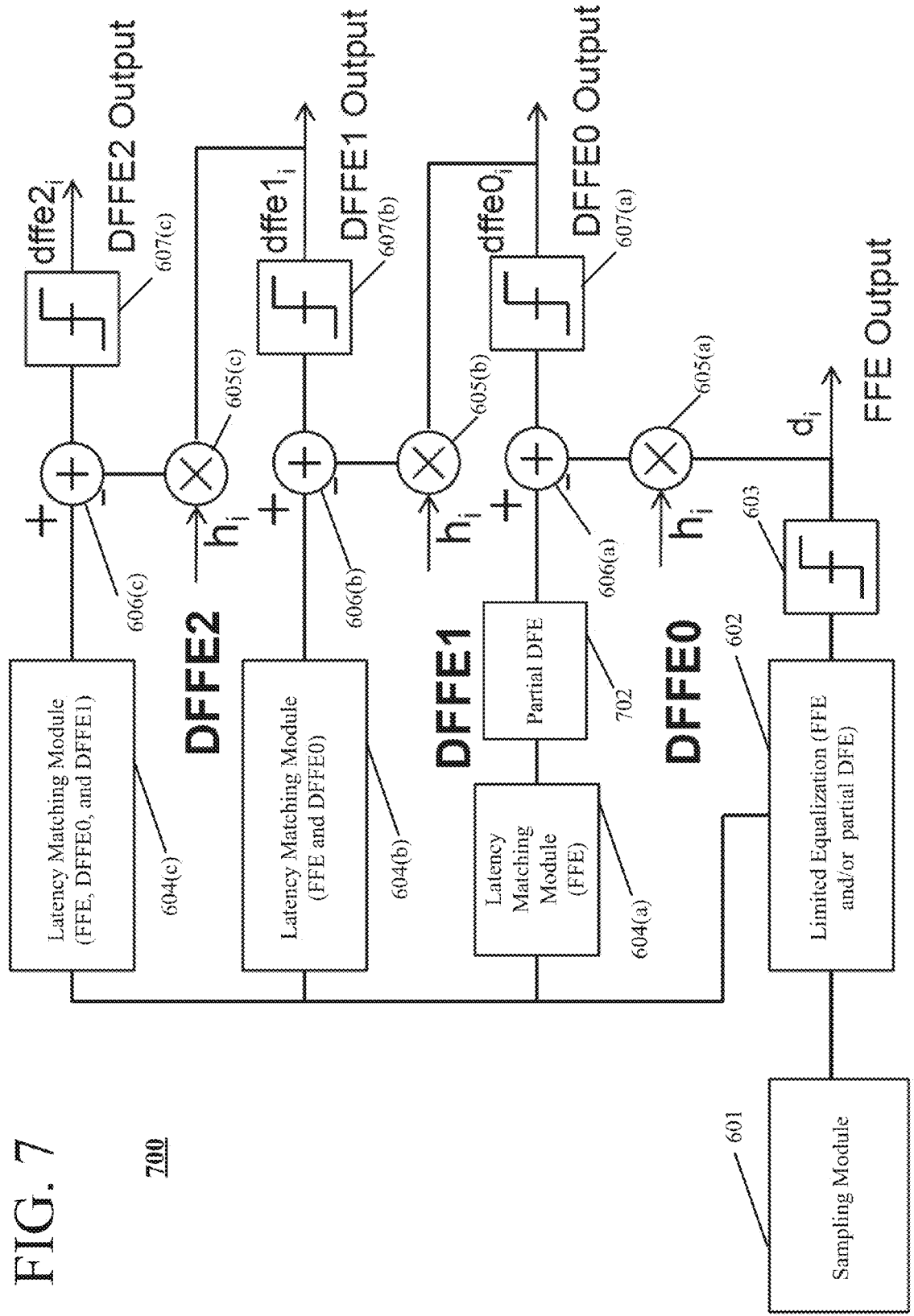
FIG. 7 shows a second cascaded implementation of a Decision Feed Forward Equalizer in accordance with an exemplary embodiment of the present invention.

FIG. 7 shows a second cascaded implementation 700 for the DFFE of FIG. 6 in accordance with an exemplary embodiment of the present invention. For the DFFE of FIG. 6, where like elements with respect to FIG. 6 operate in an analogous manner, partial DFE 702 (e.g., 1 or 2 unrolled taps for $h_1$ and $h_2$) might be employed (such as described with respect to FIG. 1) to reduce BER of the FFE output decisions $d_i$ before reconstruction of the input signal.

The performance of the multi-stage DFFE might be estimated by using the method for single stage DFFE and replacing the raw probability of error with the DFFE probability of error. Given the analysis for a single-stage from relations (1) through (5), an incorrect FFE sample only impacts the DFFE output half the time (when $d_0$ not equal to $d_1$), and an incorrect FFE sample helps in the case of $d_0=d_1$, then the probability of error at the multi-stage DFFE, (PE(dffe)), might be generalized to n-tap parallel DFFE as follows in relation (6)

$$PE(\text{dffe}) = \Sigma pe(d_i)*pe(h_i) + \Sigma pe(d_i, d_j)*pe(h_i, h_j) + \Sigma pe(d_i, d_j, d_k)*pe(h_i, h_j, h_k) + \ldots \quad (6)$$

where PE(dffe) is the probability of error on the DFFE output decision; pe($d_i$) is the probability of single bit error on $d_i$, pe($d_i$, $d_j$) is the probability of 2-bit errors on ($d_i$, $d_j$), pe($d_i$, $d_j$, $d_k$) is the probability of 3-bit errors on ($d_i$, $d_j$, $d_k$) and so on; pe($h_i$) is the probability of DFFE error due to wrong correction corresponding to incorrect sample; pe($h_i$, $h_j$) corresponds to two bits errors, pe($h_i$, $h_j$, $h_k$) to 3 bit errors, and so on.

Figure 8:
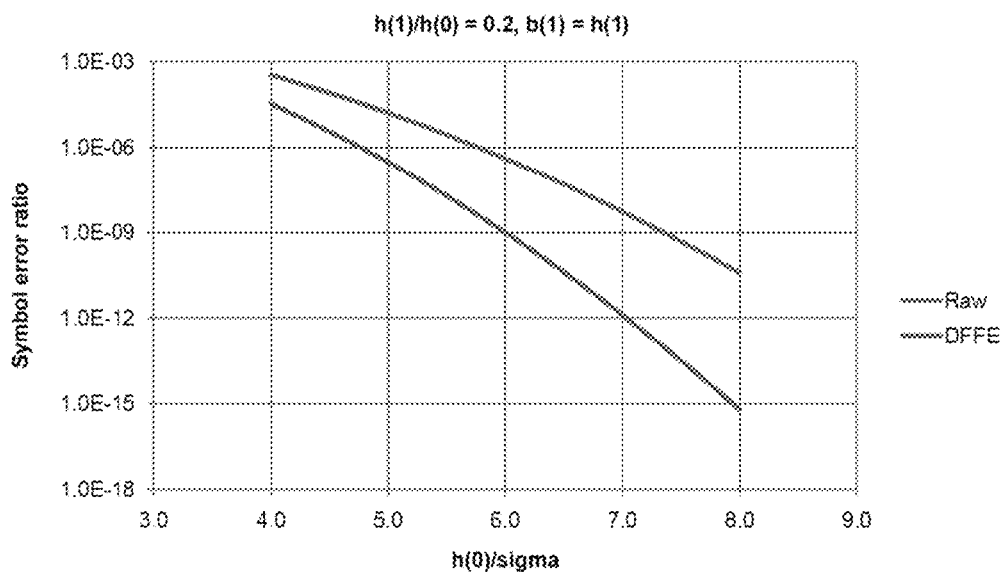
FIG. 8 illustrates DFFE processing gain as a function of signal to noise ratio of a performance simulation of the structure of FIG. 2.
Figure 9:
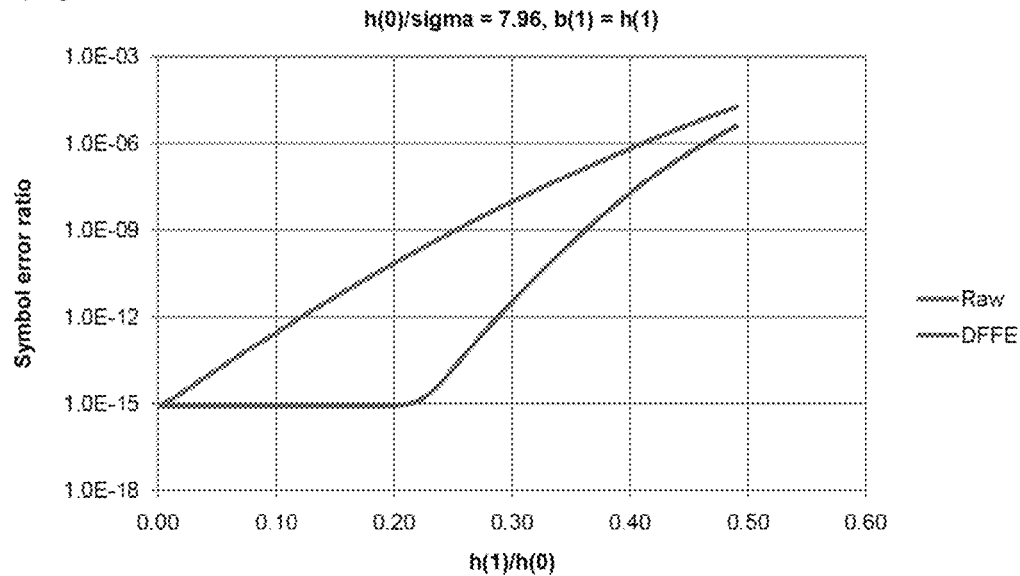
FIG. 9 illustrates DFFE processing gain as a function of correction amplitude of a performance simulation of the structure of FIG. 2.
Figure 10:
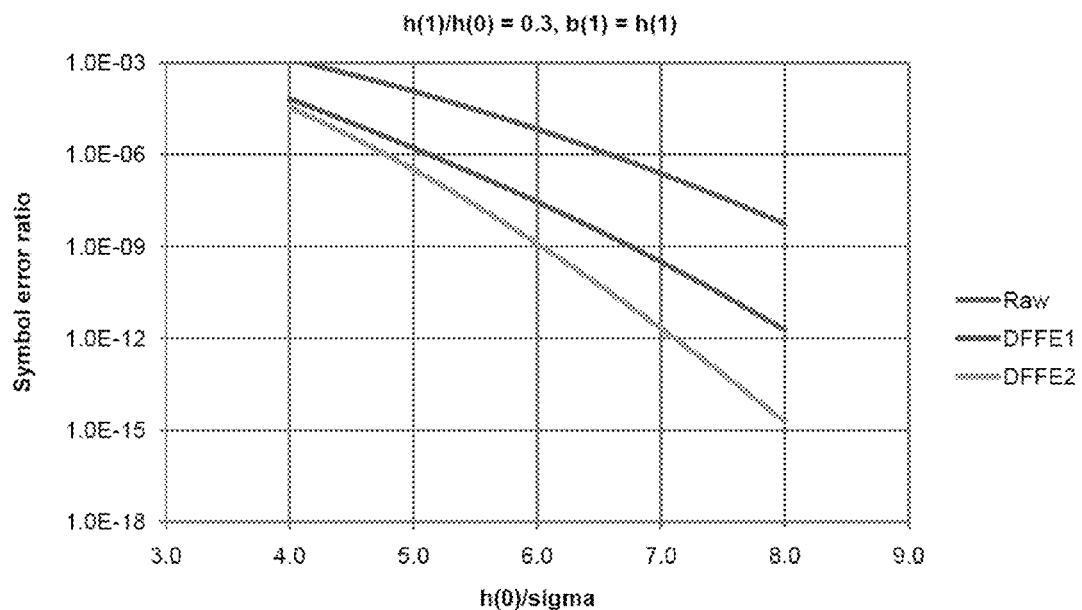
FIG. 10 illustrates DFFE processing gain as a function of signal to noise ratio of a performance simulation of the 2-stage cascaded structure of FIG. 5.
Figure 11:
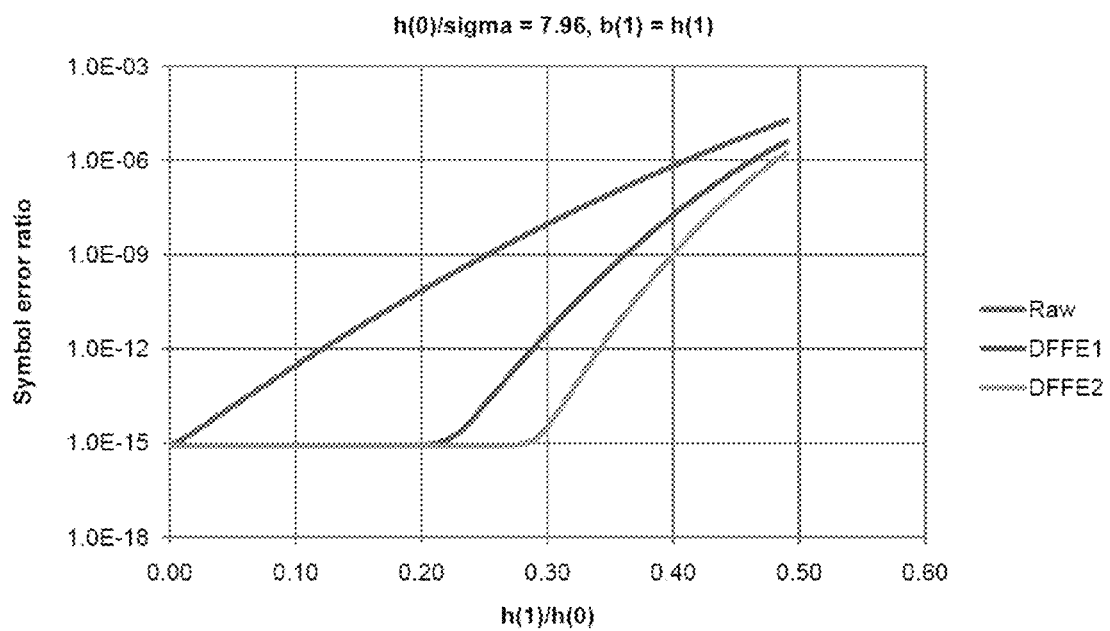
FIG. 11 illustrates DFFE processing gain as a function of correction amplitude of a performance simulation of the 2-stage cascaded structure of FIG. 5.

Performance of embodiments of the present invention might be simulated. FIG. 8 illustrates DFFE processing gain as a function of signal to noise ratio of a performance simulation of the structure of FIG. 2. FIG. 9 illustrates DFFE processing gain as a function of correction amplitude of a performance simulation of the structure of FIG. 2. FIG. 10 illustrates DFFE processing gain as a function of signal to noise ratio of a performance simulation of the 2-stage cascaded structure of FIG. 5. FIG. 11 illustrates DFFE processing gain as a function of correction amplitude of a performance simulation of the 2-stage cascaded structure of FIG. 5.

Figure 12:
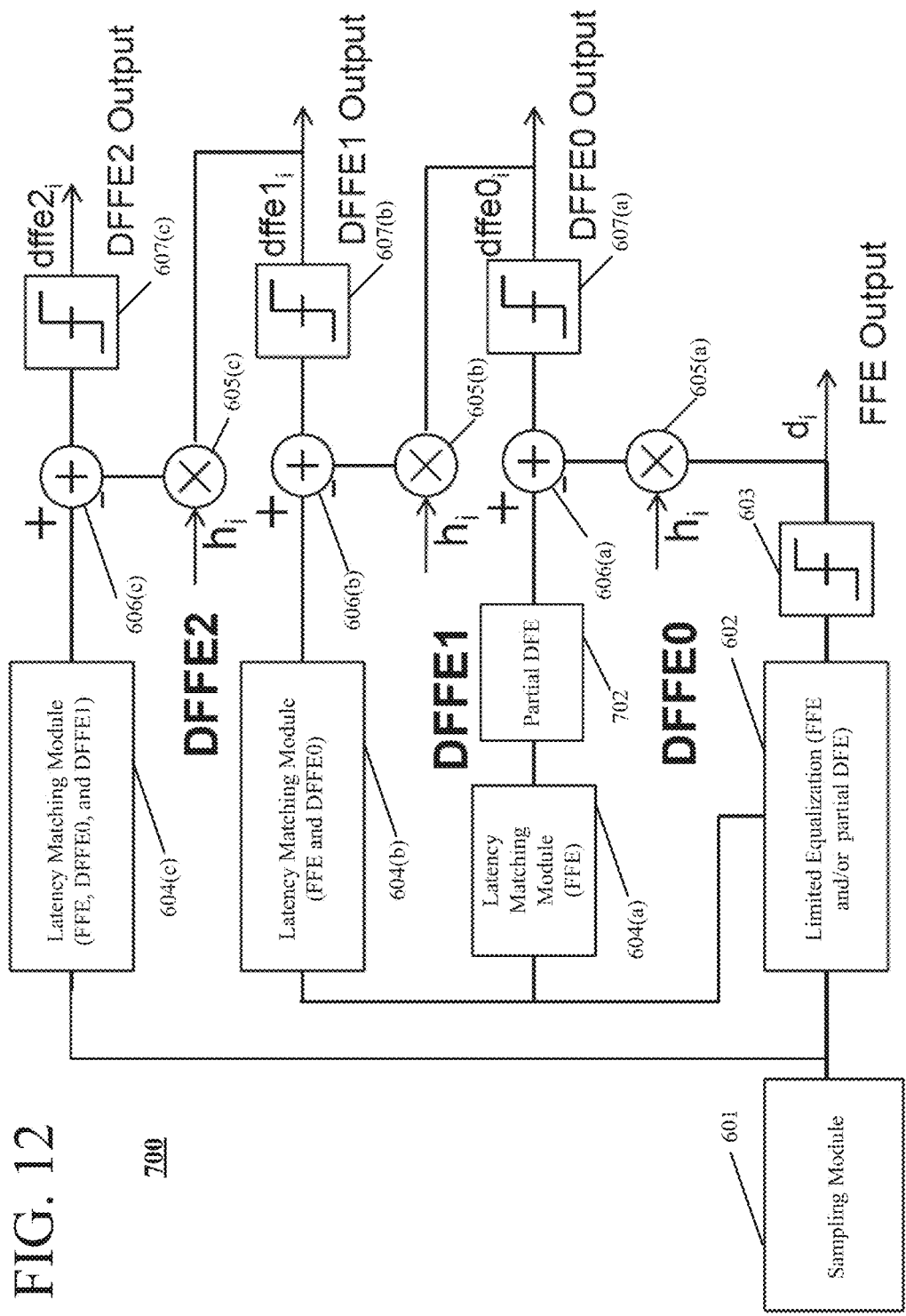
FIG. 12 shows a third cascaded implementation of a Decision Feed Forward Equalizer in accordance with an exemplary embodiment of the present invention.

FIG. 12 shows a third cascaded implementation of a Decision Feed Forward Equalizer in accordance with an exemplary embodiment of the present invention. The third cascaded implementation is similar to that shown in FIG. 7, although DFFE2 receives samples directly from sampling module 601. A cascaded DFFE structure such as that shown in FIG. 12 enables correction of pre-cursor ISI in a DFE-like fashion along with post-cursor ISI. An FFE might be employed to correct pre-cursor ISI but might provide increased noise or noise enhancement. The cascaded DFFE allows for a complete bypass of the FFE for the final samples, if necessary, since access exists to the estimates of future samples that are needed for pre-cursor ISI correction. Thus, the third cascaded DFFE enables correction of both pre-cursor and post-cursor ISI achieving measureable signal-to-noise ratio benefits.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a mufti-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc, generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be farther understood that various changes in the details, materials, and arrangements of the parts which have been described and illustrated in order to explain the nature of this invention may be made by those skilled in the art without departing from the scope of the invention as expressed in the following claims.

We claim:

1. Apparatus for generating data from an input signal received from a channel, the apparatus comprising:
   a sampling module configured to generate samples from the input signal;
   a feed-forward equalizer stage configured to i) apply feed-forward equalization to the samples and ii) generate feed-forward decisions corresponding to the samples, wherein the feed-forward equalizer stage comprises:
      a feed-forward equalizer configured to apply feed-forward equalization to the samples; and
      a feed-forward equalizer stage decision device configured to generate feed-forward decisions corresponding to the samples based on a comparison of each feed-forward equalized sample with at least one corresponding threshold;
   a decision feed-forward stage comprising:
      a latency matching module configured to adjust a delay of the feed forward equalized samples in accordance with the feed-forward decisions corresponding to the samples to generate latency-matched feed-forward equalized samples,
      logic configured to i) generate a combination of the feed-forward equalized decisions and at least one filter tap value based on a transfer function of the channel, and ii) subtract the combination from the latency-matched feed-forward equalized samples, and
      a decision device configured to generate decision feed-forward equalized (DFFE) decisions from the output of the logic.

2. The apparatus of claim 1, further comprising at least one subsequent decision feed-forward stage, each subsequent decision feed-forward stage comprising:
a corresponding latency matching module configured to adjust a delay of the feed-forward equalized samples in accordance with i) the feed-forward decisions corresponding to the samples and ii) DFFE decisions of a previous decision feed-forward stage to generate corresponding latency-matched feed-forward equalized samples,
corresponding logic configured to i) generate a corresponding combination of the DFFE decisions of the previous decision feed-forward stage and at least one filter tap value based on a transfer function of the channel, and ii) subtract the corresponding combination from the latency-matched feed-forward equalized samples of the corresponding latency matching module, and
a decision device configured to generate subsequent DFFE decisions from the output of the corresponding logic.

3. The apparatus of claim 2, wherein the apparatus further comprises a pre-cursor ISI correction decision feed-forward stage comprising:
a corresponding latency matching module coupled to the sampling module and configured to adjust a delay of the samples in accordance with i) the feed-forward decisions corresponding to the samples and ii) DFFE decisions of a previous decision feed-forward stage to generate corresponding latency-matched samples,
corresponding logic configured to i) generate a corresponding combination of the DFFE decisions of the previous decision feed-forward stage and at least one filter tap value based on a transfer function of the channel, and ii) subtract the corresponding combination from the latency-matched samples of the corresponding latency matching module, and
a decision device configured to generate: subsequent pre-cursor ISI correction DFFE decisions from the output of the corresponding logic.

4. The apparatus of claim 1, wherein the feed-forward equalizer includes a decision feedback equalizer adapted to adjust the feed-forward equalized samples.

5. The apparatus of claim 1, wherein each decision device is at least one of a comparator and a slicer.

6. The apparatus of claim 1, wherein the logic comprises a multiplier and a combiner, wherein:
the multiplier is adapted to multiply the feed-forward equalized decisions with the at least one filter tap value to generate a reconstructed signal (inter-symbol interference) ISI, and
the combiner subtracts the reconstructed signal ISI from the latency-matched feed-forward equalized samples.

7. The apparatus of claim 1, wherein the combination from the logic represents inter-symbol interference (ISI) to a transmitted symbol from one or more previous transmitted symbols transferred through the channel.

8. The apparatus of claim 1, wherein the apparatus is embodied in a receiver of a Serializer-Deserializer (SerDes) device.

9. A method of generating data from an input signal received from a channel, the method comprising the steps of:
generating samples from the input signal with a sampling module;
applying, by a feed-forward equalizer stage configured to, feed-forward equalization to the samples and thereby generating feed-forward decisions corresponding to the samples, wherein the applying the feed-forward equalization to the samples comprises:
applying, by a feed-forward equalizer, feed-forward equalization to the samples; and
generating, by a feed-forward equalizer stage decision device, feed-forward decisions corresponding to the samples based on a comparison of each feed-forward equalized sample with at least one corresponding threshold;
adjusting, by a decision feed-forward stage, a delay of the feed-forward equalized samples in accordance with the feed-forward decisions corresponding to the samples, thereby generating latency-matched feed-forward equalized samples,
generating a combination of the feed-forward equalized decisions and at east one filter tap value based on a transfer function of the channel;
subtracting the combination from the latency-matched feed-forward equalized samples, thereby providing a compensated signal, and
generating decision feed-forward equalized (DFFE) decisions from the compensated signal.

10. The method of claim 9, further comprising, by at least one subsequent decision feed-forward stage:
adjusting, by a corresponding latency matching module of each subsequent decision feed-forward stage, a delay of the feed-forward equalized samples in accordance with i) the feed-forward decisions corresponding to the samples and ii) DFFE decisions of a previous decision feed-forward stage, thereby generating corresponding latency-matched feed-forward equalized samples;
generating a corresponding combination of the DFFE decisions of the previous decision feed-forward stage and at least one filter tap value based on a transfer function of the channel;
subtracting the corresponding combination from the latency-matched feed-forward equalized samples of the corresponding latency matching module, thereby providing a subsequent corresponding compensated signal; and
generating, with a corresponding subsequent decision device, subsequent DFFE decisions from subsequent corresponding compensated signal.

11. The method of claim 10, further comprising, by a pre-cursor ISI correction decision feed-forward stage:
adjusting, with a corresponding latency matching module coupled to the sampling module, a delay of the samples in accordance with i) the feed-forward decisions corresponding to the samples and ii) DFFE decisions of a previous decision feed-forward stage to generate corresponding latency-matched samples,
generating a corresponding combination of the DFFE decisions of the previous decision feed-forward stage and at least one filter tap value based on a transfer function of the channel, and subtracting the corresponding combination from the latency-matched samples of the corresponding latency matching module, thereby providing a pre-cursor ISI correction compensated signal; and
generating subsequent pre-cursor ISI correction DFFE decisions from the pre-cursor ISI correction compensated signal.

12. The method of claim 9, wherein the applying the feed-forward equalization to the samples comprises applying a decision feedback equalization, thereby adjusting the feed-forward equalized samples.

13. The method of claim 9, wherein the generating decision feed-forward equalized (DFFE) decisions employs at least one of a comparator and a slicer.

14. The method of claim 9, comprising:
multiplying the feed-forward equalized decisions with the at least one filter tap value to generate a reconstructed signal (inter-symbol interference) ISI, and
wherein the subtracting subtracts the reconstructed signal ISI from the latency-matched feed-forward equalized samples.

15. The method of claim 9, wherein the compensated signal represents inter-symbol interference (ISI) to a transmitted symbol from one or more previous transmitted symbols transferred through the channel.

16. The method of claim 9, wherein the method is embodied as program steps of a processor in a receiver of a Serializer-Deserializer (SerDes) device.

17. A non-transitory machine-readable storage meditate, having encoded thereon program code, wherein, when the program code is executed by a machine, the machine implements a method for generating data from an input signal received from a channel comprising the steps of:
generating samples from the input signal;
applying, by a feed-forward equalizer stage configured to, feed-forward equalization to the samples and thereby generating feed-forward decisions corresponding to the samples, wherein the applying the feed-forward equalization to the samples comprises:
applying, by a feed-forward equalizer, feed-forward equalization to the samples; and
generating, by a feed-forward equalizer stage decision device, feed-forward decisions corresponding to the samples based on a comparison of each feed-forward equalized sample with at least one corresponding threshold;
adjusting, by a decision feed-forward stage, a delay of the feed-forward equalized samples in accordance with the feed-forward decisions corresponding to the samples, thereby generating latency-matched feed-forward equalized samples,
generating a combination of the feed-forward equalized decisions and at least one filter tap value based on a transfer function of the channel;
subtracting the combination from the latency-matched feed-forward equalized samples, thereby providing a compensated signal, and
generating decision feed-forward equalized (DFFE) decisions from the compensated signal.

* * * * *